United States Patent
Yokochi

(10) Patent No.: US 10,254,748 B2
(45) Date of Patent: Apr. 9, 2019

(54) INSPECTION WORK SUPPORT DEVICE, INSPECTION WORK SUPPORT SYSTEM, AND INSPECTION WORK SUPPORT METHOD

(71) Applicant: YOKOGAWA ELECTRIC CORPORATION, Tokyo (JP)

(72) Inventor: Yutaka Yokochi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 242 days.

(21) Appl. No.: 15/267,609

(22) Filed: Sep. 16, 2016

(65) Prior Publication Data
US 2017/0090469 A1    Mar. 30, 2017

(30) Foreign Application Priority Data

Sep. 25, 2015    (JP) ................. 2015-188090

(51) Int. Cl.
*G06F 19/00*    (2018.01)
*G05B 19/418*    (2006.01)
(Continued)

(52) U.S. Cl.
CPC ... *G05B 19/4183* (2013.01); *G05B 19/41875* (2013.01); *G05B 23/0272* (2013.01); *G06K 7/10297* (2013.01); *G06T 11/60* (2013.01); *G05B 19/4184* (2013.01); *G05B 2219/25062* (2013.01); *G05B 2219/31197* (2013.01); *G05B 2219/31304* (2013.01);
(Continued)

(58) Field of Classification Search
CPC .. G06Q 10/0639; G06Q 10/063; G05B 11/01; G05B 2219/32128; G05B 19/4184; G05B 19/4183; G06F 17/30554; H04W 4/70; H04J 1/00
See application file for complete search history.

(56) References Cited

U.S. PATENT DOCUMENTS

| | | | |
|---|---|---|---|
| 8,781,882 B1 * | 7/2014 | Arboletti ............ | G06Q 10/0639 705/7.11 |
| 2008/0234837 A1 | 9/2008 | Samudrala et al. | |

(Continued)

FOREIGN PATENT DOCUMENTS

| | | |
|---|---|---|
| EP | 1 296 209 A1 | 3/2003 |
| JP | 11-039030 A | 2/1999 |

(Continued)

*Primary Examiner* — Tuan A Vu
(74) *Attorney, Agent, or Firm* — Sughrue Mion, PLLC

(57) ABSTRACT

An inspection work support device that supports inspection work performed in a plant, includes: a storage that stores an apparatus ledger in which apparatus information of an apparatus installed in the plant is registered, and an inspection list which indicates a list of inspection targets; an indicator that indicates the inspection target to be inspected based on the inspection list; an acquisition part that acquires apparatus specification information which is required for specifying the apparatus; a search part that searches the apparatus ledger based on the apparatus specification information acquired by the acquisition part to obtain the apparatus information; and a display that displays the inspection target indicated by the indicator and the apparatus information obtained by the search part.

20 Claims, 7 Drawing Sheets

(51) Int. Cl.
*G05B 23/02* (2006.01)
*G06K 7/10* (2006.01)
*G06T 11/60* (2006.01)

(52) U.S. Cl.
CPC .............. *G05B 2219/32128* (2013.01); *G05B 2219/32226* (2013.01); *G05B 2219/35422* (2013.01); *G05B 2219/36167* (2013.01); *Y02P 90/10* (2015.11); *Y02P 90/22* (2015.11)

(56) References Cited

U.S. PATENT DOCUMENTS

| | | | |
|---|---|---|---|
| 2009/0228121 A1 | 9/2009 | Fujiwara et al. | |
| 2012/0116827 A1* | 5/2012 | Susumago | G06Q 10/063 |
| | | | 705/7.11 |
| 2014/0282257 A1* | 9/2014 | Nixon | G05B 11/01 |
| | | | 715/835 |
| 2016/0132046 A1* | 5/2016 | Beoughter | G06F 17/30554 |
| | | | 700/17 |
| 2016/0314685 A1* | 10/2016 | Sandoval-Castillo | ........................ |
| | | | H04W 4/70 |

FOREIGN PATENT DOCUMENTS

| | | |
|---|---|---|
| JP | 2001-118177 A | 4/2001 |
| JP | 2006-106936 A | 4/2006 |
| JP | 2006-146749 A | 6/2006 |
| JP | 2007-334438 A | 12/2007 |
| JP | 2012-242932 A | 12/2012 |
| JP | 2015-75855 A | 4/2015 |
| WO | 2007/013466 A1 | 2/2007 |
| WO | 2008/103225 A1 | 8/2008 |
| WO | 2012/016012 A2 | 2/2012 |

\* cited by examiner

INSPECTION WORK SUPPORT DEVICE, INSPECTION WORK SUPPORT SYSTEM, AND INSPECTION WORK SUPPORT METHOD

BACKGROUND OF THE INVENTION

Field of the Invention

The present invention relates to an inspection work support device, an inspection work support system, and an inspection work support method.

Priority is claimed on Japanese Patent Application No. 2015-188090, filed on Sep. 25, 2015, the content of which is incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

Hitherto, in plants, factories or the like (hereinafter, referred to as "plants" in a case where they are collectively termed), maintenance by workers has been performed at regular or irregular intervals, for example, in order to prevent abnormal operations from occurring, or to cope with unexpected problems. For example, in a plant having a distributed control system (DCS) constructed therein, field apparatuses (measuring instruments and operating instruments) are inspected or maintained as the above maintenance. Since a combination of apparatuses (including field apparatuses), devices, and facilities of various kinds are installed in the field of a plant, the worker's inspections are performed in accordance with an inspection list (list in which an inspection order, inspection targets, points for attention during inspection, and the like are specified) prepared in advance.

Specifically, a worker brings a printed inspection list and writing instruments such as a pen with him, inspects an inspection target while moving along an inspection route in accordance with the inspection list, and performs the work of entering, in the inspection list, inspection results of points for attention specified in the inspection list, or points, not yet specified in the inspection list, which are perceived by the worker. In addition, the worker also enters points (such as, for example, an abnormal sound and an abnormal odor) perceived with the five senses while moving along the inspection route, in the inspection list. Further, the worker makes contact with, as necessary, an operator (operator of a plant) working at a central control room using, for example, a cellular phone or the like, and confirms the situation.

Japanese Unexamined Patent Application, First Publication No. H11-39030 discloses an example of the related art in which the work of workers in the field is supported. Specifically, Japanese Unexamined Patent Application, First Publication No. H11-39030 discloses a technique in which a piping diagram within a factory is displayed, icons corresponding to respective apparatuses (traps) are displayed on this piping diagram, a display window is displayed on a screen when any of these respective icons is double-clicked, and detailed data of the apparatus corresponding to the double-clicked icon is displayed within this display window, thereby allowing detailed information of the respective apparatuses to be intuitively ascertained from the arrangement relationship of the respective apparatuses on the piping diagram.

As described above, since a combination of apparatuses and the like of various kinds are installed in the field of a plant, it is not necessarily easy for a worker who works in the field of a plant to locate (specify) inspection targets specified in the inspection list. For this reason, it takes a long time for a worker to locate the inspection targets specified in the inspection list, which leads to a problem of the efficiency of work decreasing.

In addition, since apparatuses and the like similar in external appearance to each other may be installed close to each other in the field of a plant, there can be assumed to be cases in which, even when a worker locates inspection targets specified in an inspection list and performs inspection work, apparatuses and the like on which inspection work is performed by the worker are in reality different from the inspection targets specified in the inspection list. In such a case, there is a problem performing the repair and maintenance of a plant due to the inspection targets (inspection targets to be inspected) specified in the inspection list not being inspected.

In addition, even when there are points perceived by the worker with respect to targets other than the inspection targets specified in the inspection list while the worker moves along the inspection route, a problem may occur in which the above targets cannot be specified afterwards by referring to the inspection list in a case where the targets are erroneously entered during entry into the inspection list. In addition, when the worker mistakes a target, there is a problem in that the worker may not be able to successfully confirm the situation even in a case where the worker makes contact with an operator working at the central control room using a cellular phone or the like.

SUMMARY OF THE INVENTION

The present invention provides an inspection work support device, an inspection work support system, and an inspection work support method which are capable of rapidly and accurately specifying an inspection target.

According to an aspect of the present invention, an inspection work support device (15) is provided that supports inspection work which is performed in a plant, the device including: a storage (28) that stores an apparatus ledger (L1) in which apparatus information of an apparatus (11) installed in the plant is registered, and an inspection list (L2) indicating a list of inspection targets; an indicator (29b) that indicates the inspection target to be inspected based on the inspection list; an acquisition part (22, 23, 29a) that acquires apparatus specification information which is required for specifying the apparatus; a search part (29c) that searches the apparatus ledger based on the apparatus specification information acquired by the acquisition part to obtain the apparatus information; and a display (25) that displays the inspection target indicated by the indicator and the apparatus information obtained by the search part. In addition, the inspection work support device of the present invention may further include a response processor (29e) that causes the apparatus to perform response processing specified in advance, using the apparatus information obtained by the search part.

In addition, the inspection work support device of the present invention may further include a communicator (26) capable of communicating with a controller (12) that controls the apparatus, and the response processor causes the apparatus to perform the response processing by transmitting a control request to cause the apparatus to perform the response processing to the controller through the communicator.

In addition, in the inspection work support device of the present invention, the acquisition part may include at least one of: a first acquisition part (29a) that performs image processing on an image acquired by an image processor (21) to acquire information of an identifier (CD), provided in association with the apparatus included in the image, as the apparatus specification information; a second acquisition part (22) that performs near field communication with a near field communication tag (TG) provided in association with the apparatus to acquire storage information stored in the near field communication tag as the apparatus specification information; and a third acquisition part (23) that acquires position information indicating an installation position of the apparatus as the apparatus specification information based on a position of the device.

In addition, in the inspection work support device of the present invention, in a case where the acquisition part includes at least two or more of the first acquisition part, the second acquisition part, and the third acquisition part, those acquiring the apparatus specification information may be capable of selecting.

In addition, the inspection work support device of the present invention may further include: an operator (25) that is operated by a worker who works in the plant; and a registration part (29d) that registers the apparatus information of the apparatus to be used as the inspection target, in the apparatus ledger, based on operation contents of the operator, and adds the apparatus, as the inspection target, to the inspection list.

In addition, in the inspection work support device of the present invention, the storage may store map information (M) of the plant, and the device may further include a first display processor (29f) that superimposes at least the inspection target indicated by the indicator on a map of the plant, using the map information stored in the storage, to display the superimposed target on the display.

In addition, in the inspection work support device of the present invention, in a case where the acquisition part includes the third acquisition part, the first display processor may superimpose the position of the device on the map of the plant to display the superimposed position on the display.

Alternatively, the inspection work support device of the present invention may further include a second display processor (29g) that superimposes additional information indicating the inspection target indicated by the indicator, on the image acquired by the image processor, to display the superimposed information on the display.

According to an aspect of the present invention, an inspection work support system (1) is provided that supports inspection work which is performed in a plant, the system including: a controller (12) that controls an apparatus (11) installed in the plant; and the inspection work support device (15) that transmits a control request to cause the apparatus to perform the response processing to the controller.

According to an aspect of the present invention, an inspection work support method of supporting inspection work which is performed in a plant is provided, the method including: a first step (S12) of displaying an inspection target indicated based on an inspection list (L2) indicating a list of inspection targets; a second step (S13) of acquiring apparatus specification information required for specifying an apparatus (11) installed in the plant; a third step (S14) of searching an apparatus ledger (L1) in which apparatus information of the apparatus is registered based on the apparatus specification information acquired in the second step, to obtain the apparatus information; and a fourth step (S15) of displaying the apparatus information obtained in the third step. In addition, the inspection work support method of the present invention may further include a fifth step (S33) of causing the apparatus to perform response processing specified in advance, using the apparatus information obtained in the third step.

In addition, in the inspection work support method of the present invention, in the fifth step, the apparatus may be caused to perform the response processing by a control request for causing the apparatus to perform the response processing being transmitted.

In addition, in the inspection work support method of the present invention, the second step may include at least one of: a sixth step of performing image processing on an acquired image to acquire information of an identifier, provided in association with the apparatus included in the image, as the apparatus specification information; a seventh step of performing near field communication with a near field communication tag provided in association with the apparatus to acquire storage information stored in the near field communication tag as the apparatus specification information; and an eighth step of acquiring position information indicating an installation position of the apparatus as the apparatus specification information based on a position of the inspection work support device.

In addition, in the inspection work support method of the present invention, in a case where the second step includes at least two or more of the sixth step, the seventh step, and the eighth step, those acquiring the apparatus specification information may be capable of selecting.

According to the present invention, since the inspection target indicated by the indicator based on the inspection list is displayed on the display, and the apparatus information obtained by searching the apparatus ledger based on the apparatus specification information acquired by the acquisition part is displayed on the display, it is possible to rapidly and accurately specify the inspection target.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE INVENTION

Hereinafter, an inspection work support device, an inspection work support system, and an inspection work support method according to an embodiment of the present invention will be described in detail with reference to the accompanying drawings.

(Inspection Work Support System)

Figure 1:
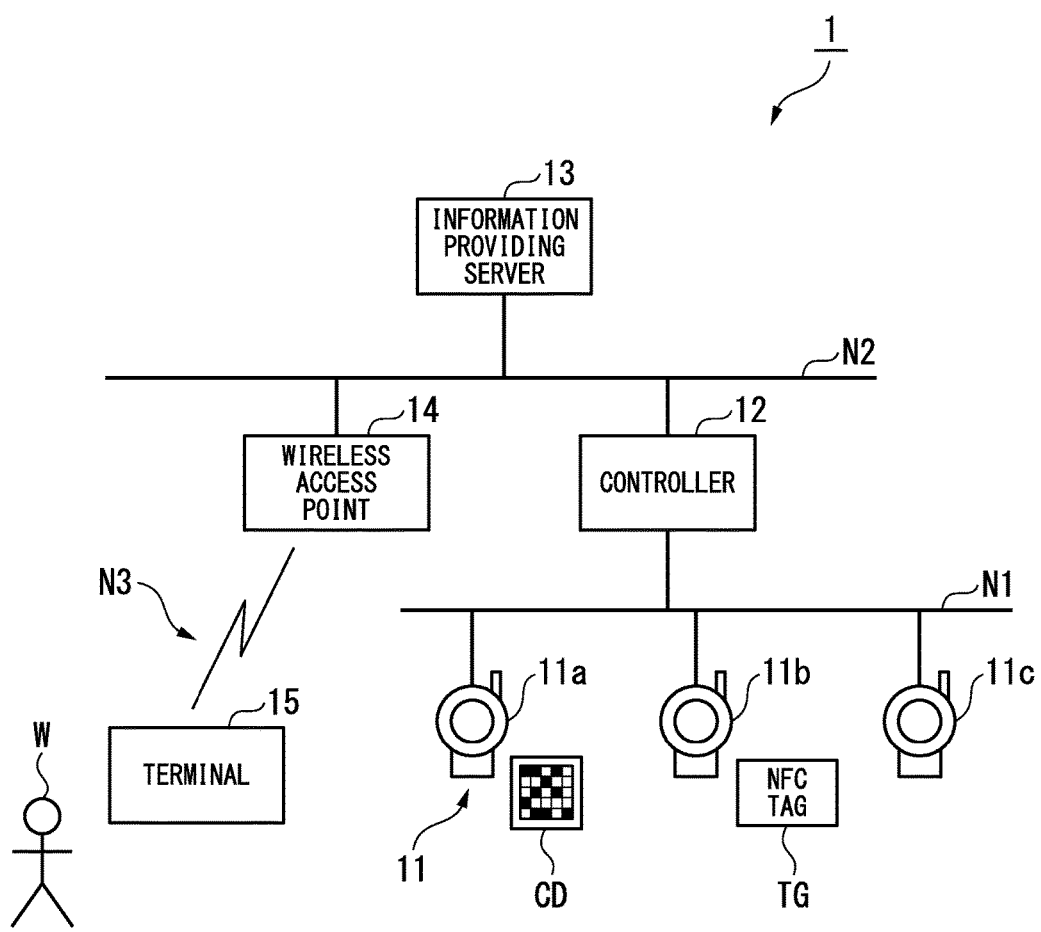
FIG. 1 is a block diagram illustrating an entire configuration of an inspection work support system according to an embodiment of the present invention.

FIG. 1 is a block diagram illustrating an entire configuration of an inspection work support system according to an embodiment of the present invention. As shown in FIG. 1, an inspection work support system 1 of the present embodiment includes a field apparatus 11 (apparatus), a controller 12, an information providing server 13, a wireless access point 14, and a terminal 15 (inspection work support device), and supports inspection work of a field apparatus 11 which is performed in a plant by a worker W.

In the present embodiment, for easier understanding, a description will be given by taking an example of a case where the field apparatus 11 serves as an inspection target, and the worker W performs the inspection work of the field apparatus 11. However, the inspection target is not limited to the field apparatus 11, and any apparatuses, devices, and facilities (hereinafter, simply referred to as "apparatuses" in a case where they are collectively termed) installed in the field of a plant can serve as inspection targets. Here, an example of the aforementioned plant includes, in addition to an industrial chemical plant, a plant for managing and controlling a well site such as a gas field or a petroleum field and its vicinities, a plant for managing and controlling the generation of electric power such as hydraulic power, thermal power or nuclear power, a plant for managing and controlling energy harvesting such as sunlight or wind power, a plant for managing and controlling water and sewage or a dam, or the like.

As shown in FIG. 1, the field apparatus 11 and the controller 12 are connected to a control network N1. In addition, the controller 12, the information providing server 13, and the wireless access point 14 are connected to an intranet N2. In addition, the wireless access point 14 and the terminal 15 are connected to each other through a wireless network N3.

The control network N1 is, for example, a network for control constructed in the field of a plant. The control network N1 is, for example, a wired industrial network based on HART (Registered Trademark), FieldBus or the like. The control network N1 may be, for example, a wireless industrial network based on ISA100.11a, WirelessHART (Registered Trademark) or the like. The intranet N2 is, for example, a network, such as Ethernet (Registered Trademark), constructed separately from the control network N1 in the field of a plant. The wireless network N3 is a wireless network formed in the field of a plant by the wireless access point 14. The wireless network N3 is, for example, a wireless network capable of wireless communication based on a wireless communication standard such as Wi-Fi (Registered Trademark), WiMAX (Registered Trademark), or 3G/LTE (Registered Trademark).

The field apparatus 11 is an apparatus, installed in the field of a plant, which performs measurement, an operation or the like required for process control under the control of the controller 12. The field apparatus 11 is, for example, a sensor apparatus such as a flowmeter or a temperature sensor, a valve apparatus such as a flow rate control valve or an on-off valve, an actuator apparatus such as a fan or motor, an image capturing apparatus, such as a camera or a camcorder, which captures an image of the situation or target within a plant, an acoustic apparatus, such as a microphone or a speaker, which collects an abnormal sound or the like within a plant or issues a warning sound or the like, a position detection apparatus that outputs position information of each apparatus, or other apparatuses. FIG. 1 shows three field apparatuses 11a to 11c of a plurality of field apparatuses 11 installed in the field of a plant.

The field apparatus 11 is provided, as necessary, with an information code CD (identifier) and an NFC tag TG (near field communication tag). In the example shown in FIG. 1, the field apparatus 11a is provided with the information code CD, and the field apparatus 11b is provided with the NFC tag TG. The field apparatus 11c is provided with none of the information code CD and the NFC tag TG. The information code CD is, a one-dimensional code such as, for example, a bar code, or a matrix type two-dimensional code such as a QR code (Registered Trademark).

The NFC tag TG includes an antenna and a memory (not shown in the drawing), is operated by the supply of power from the outside (for example, terminal 15), and performs near field communication (NFC) between the outside and the tag. Here, the term "NFC" means, for example, communication (contactless communication) capable of being performed in a case where a distance between communicating devices is equal to or less than several tens of cm, and also includes communication performed in a state where the housings of communicating devices come into contact. The information code CD includes, for example, identification information for specifying the field apparatus 11a, and the NFC tag TG has, for example, tag information (storage information) for specifying the field apparatus 11b stored therein.

The controller 12 is a device which is the core of a distributed control system (DCS), and controls the field apparatus 11 by collecting various data (for example, data indicating flow rate, temperature, pressure, and the like) from the field apparatus 11 and obtaining the amount of operation for performing process control using the collected various data. In addition, the controller 12 causes the field apparatus 11 to perform squawk (response processing) based on a control request from the terminal 15. For example, the controller 12 performs control to cause a display device or a lamp (not shown in the drawing) provided in the field apparatus 11 indicated by the control request from the terminal 15 to blink. The reason for performing such control is to make it possible to rapidly and accurately specify the field apparatus 11 as an inspection target installed in a plant.

The information providing server 13 stores apparatus information of the field apparatus 11 (the name, model number, specification, and other information of the field apparatus 11) installed in a plant, and provides the apparatus information of the field apparatus 11 according to a request for transmission which is transmitted through the intranet N2, through the intranet N2. For example, in a case where information (information for specifying the field apparatus 11) of a bar code attached to the field apparatus 11 is transmitted from the terminal 15 through the intranet N2, the information providing server 13 provides the apparatus information of the field apparatus 11 specified by the information to the terminal 15 through the intranet N2.

The wireless access point 14 forms the aforementioned wireless network N3, and performs a relay between data transmitted and received through the wireless network N3 and data transmitted and received through the intranet N2. The providing of such a wireless access point 14 makes it possible to communicate between the terminal 15, and the controller 12 and the information providing server 13. In the present embodiment, to simplify description, a description is given by taking an example of the wireless access point 14 that directly connects the wireless network N3 to the intranet N2, but the wireless access point 14 may be a relay apparatus for connection to the intranet N2 through a public line such as the third-generation mobile communication system (3G) or the fourth-generation mobile communication system (4G).

The terminal 15 is a device which is used when an apparatus installed in a plant is inspected, and is used by the worker W who performs inspection work. The terminal 15 is, for example, a smartphone or a tablet-type computer, but a terminal (for example, spectacle-type or watch-type terminal) of any form can be used insofar as the device is a terminal having a function (such as, for example, a display function or a wireless communication function) required for performing inspection work.

(Inspection Work Support Device)

Figure 2:
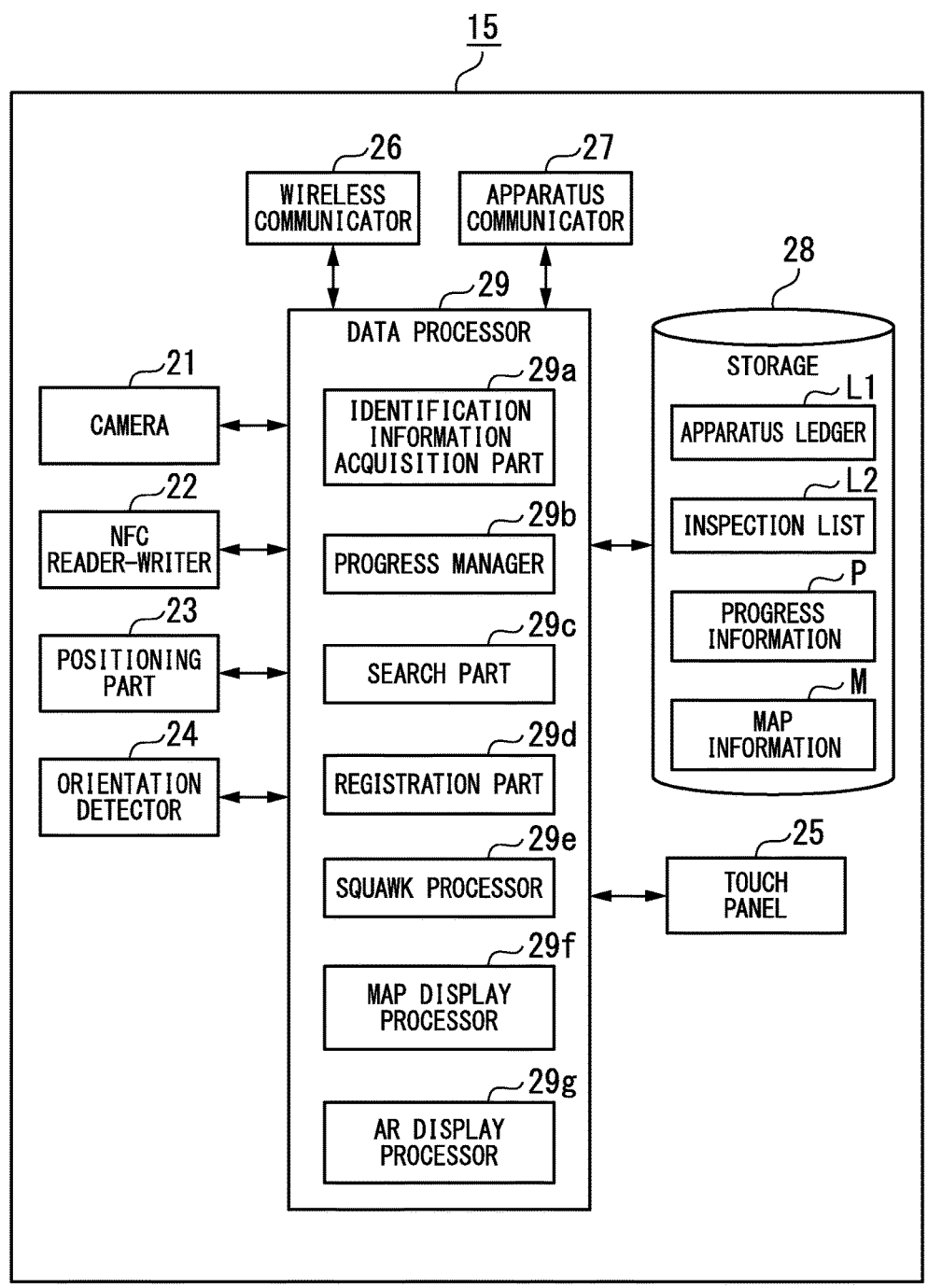
FIG. 2 is a block diagram illustrating main components of a terminal as the inspection work support device according to an embodiment of the present invention.

FIG. 2 is a block diagram illustrating main components of the terminal as an inspection work support device according to an embodiment of the present invention. As shown in FIG. 2, the terminal 15 includes a camera 21 (image processor), an NFC reader-writer 22 (acquisition part, second acquisition part), a positioning part 23 (acquisition part, third acquisition part), a orientation detector 24, a touch panel 25 (display, operator), a wireless communicator 26 (communicator), an apparatus communicator 27, a storage 28, and a data processor 29.

The camera 21 includes a solid-state image sensing device such as a charge coupled device (CCD) or a complementary metal oxide semiconductor (CMOS), and can capture a still image and a moving image. The NFC reader-writer 22 acquires tag information (apparatus specification information) stored in the NFC tag TG by supplying power to the NFC tag TG in a non-contact manner, and performing NFC between the NFC tag TG and the reader-writer. The NFC reader-writer 22 can also write data in the NFC tag TG.

The positioning part 23 measures the position of the terminal 15. Specifically, the positioning part 23 acquires information indicating (apparatus specification information) the position of the terminal 15 by receiving radio waves from a global positioning system (GPS) satellite and performing signal processing on the received signal. Here, for example, when the terminal 15 is disposed at the installation position of the field apparatus 11c, position information indicating the installation position of the field apparatus 11c is acquired by the positioning part 23. The orientation detector 24 includes a gyro sensor, a geomagnetic sensor (electronic compass) or the like, and detects the posture or orientation of the terminal 15. When the detection result of the orientation detector 24 is used, it is possible to specify, for example, the image-capturing direction of the camera 21.

The touch panel 25 is an operation display device in which a display device such as a liquid crystal display or an organic EL (Electro Luminescence) display device and an input device such as a touch pad are combined. The wireless communicator 26 is capable of the aforementioned wireless communication based on a wireless communication standard such as Wi-Fi (Registered Trademark), WiMAX (Registered Trademark), or 3G/LTE (Registered Trademark), and performs communication through the wireless network N3. The apparatus communicator 27 performs wireless communication such as infrared communication or cable communication such as universal serial bus (USB) communication, between the field apparatus 11 and the communicator.

The storage 28 is implemented by, for example, a hard disk or a non-volatile semiconductor memory, and stores various types of information required for the worker W to perform inspection work in the field of a plant. Specifically, the storage 28 stores an apparatus ledger L1, an inspection list L2, progress information P, and map information M. The apparatus ledger L1 is a ledger (electronic ledger) in which apparatus information of an apparatus installed in a plant is registered. The inspection list L2 is a list (electronic list) indicating a list of inspection targets required for the worker W to perform inspection work. The progress information P is information indicating progress information of inspection work which is performed by the worker W. The map information M is information of the map of a plant. The map information M may be two-dimensional map information, and may be three-dimensional map information.

Figure 3:
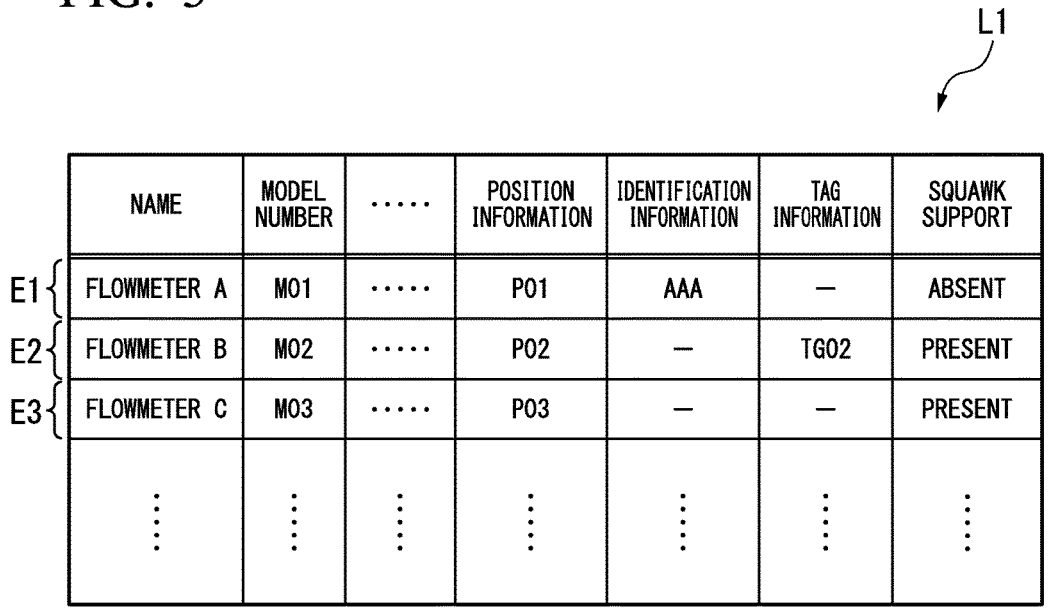
FIG. 3 is a diagram illustrating an example of contents of an apparatus ledger which is used in an embodiment the present invention.

FIG. 3 is a diagram illustrating an example of the contents of the apparatus ledger which is used in an embodiment of the present invention. As shown in FIG. 3, the apparatus ledger L1 is a ledger in which apparatus information such as a "name" and a "model number" and attached information including "position information", "identification information", "tag information", and "squawk support" are stored for each apparatus installed in a plant. The "name" is information indicating the name of an apparatus, and the "model number" is information indicating the model number of an apparatus. The "position information" is information indicating the installation position of an apparatus. The "identification information" is information stored in the information code CD provided in association with an apparatus, and the "tag information" is information stored in the NFC tag TG provided in association with an apparatus. The "squawk support" is information indicating whether an apparatus supports squawk (whether squawk can be performed).

Information stored in an entry E1 of the apparatus ledger L1 shown in FIG. 3 is about the field apparatus 11a shown in FIG. 1, information stored in an entry E2 is about the field apparatus 11b shown in FIG. 1, and information stored in an entry E3 is about the field apparatus 11c shown in FIG. 1. As shown in FIG. 1, since the field apparatus 11a is provided with the information code CD, identification information "AAA" included in the information code CD is stored in the "identification information" of the entry E1. In addition, since the field apparatus 11b is provided with the NFC tag TG, tag information "TG02" stored in the NFG tag TG is stored in the "tag information" of the entry E2. Since the field apparatus 11c is provided with none of the information code CD and the NFC tag TG, information is not stored in the "identification information" and the "tag information" of the entry E3.

Figure 4:
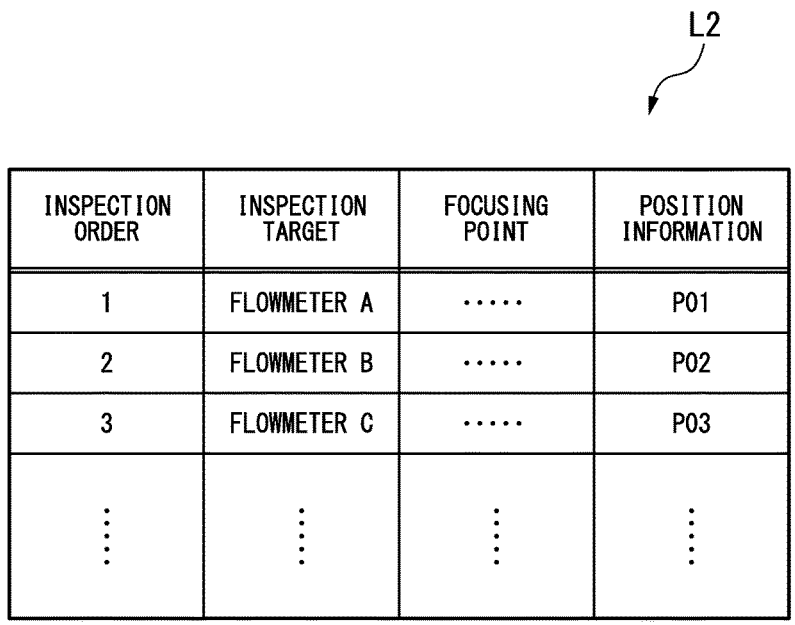
FIG. 4 is a diagram illustrating an example of contents of an inspection list which is used in an embodiment of the present invention.

FIG. 4 is a diagram illustrating an example of the contents of the inspection list which is used in an embodiment of the present invention. As shown in FIG. 4, the inspection list L2 is a list with which an "inspection order", an "inspection target", a "focusing point", "position information", and the like are associated. The "inspection order" is literally information indicating the inspection order of the field apparatuses 11 as inspection targets. The "inspection target" is information indicating the field apparatus 11 on which inspection work is performed by the worker W. The "focusing point" is information indicating a point to be focused when the worker W performs inspection work of an inspection target. The "position information" is information indicating the installation position of an inspection target. The inspection list L2 illustrated in FIG. 4 is an inspection list in a case where inspection work is performed in the order of field apparatuses 11a to 11c shown in FIG. 1.

The data processor 29 processes various data handled by the terminal 15. For example, the data processor 29 processes various data obtained by the camera 21 to the orientation detector 24, data displayed on the touch panel 25, data which is input from the touch panel 25, data transmitted and received through the wireless communicator 26 or the apparatus communicator 27, data which is input and output to and from the storage 28, and other data.

The data processor 29 includes an identification information acquisition part 29a (acquisition part, first acquisition part), a progress manager 29b (indicator), a search part 29c, a registration part 29d, a squawk processor 29e (response processor), a map display processor 29f (first display processor), and an AR display processor 29g (second display processor). The identification information acquisition part 29a acquires identification information (apparatus specification information) included in the information code CD by performing image processing on an image captured by the camera 21. The process in the identification information acquisition part 29a is performed in a case where the image captured by the camera 21 is an image including an image of the information code CD, but is not performed in a case where the image is an image that does not include the image of the information code CD.

The progress manager 29b manages progress information of inspection work performed by the worker W using the inspection list L2 and the progress information P which are stored in the storage 28. Specifically, the progress manager 29b updates the progress information P in accordance with the progress situation of the worker W, and indicates an inspection target to be inspected next based on the progress information P and the contents of the inspection list L2. For example, in a case where the inspection list L2 shown in FIG. 4 is stored in the storage 28, and inspection work of a "flowmeter A" which is performed by the worker W is terminated, the progress manager 29b stores information indicating that the inspection work of the "flowmeter A" is terminated, in the progress information P, and indicates a "flowmeter B" as an inspection target to be inspected next based on the inspection list L2.

The search part 29c searches the apparatus ledger L1 stored in the storage 28 and obtains apparatus information, based on the identification information acquired by the identification information acquisition part 29a, the tag information acquired by the NFC reader-writer 22, or the position information acquired by the positioning part 23. Information which is used as a key at the time of searching the apparatus ledger L1 can be selected from the identification information acquired by the identification information acquisition part 29a, the tag information acquired by the NFC reader-writer 22, and the position information acquired by the positioning part 23.

The registration part 29d registers apparatus information of an apparatus to be inspected in the apparatus ledger L1, based on the operation contents of the touch panel 25, and adds the apparatus, as an inspection target, to the inspection list L2. The registration part 29d is provided, for example, in order to be able to newly register an apparatus which is not specified in the inspection list L2 but is perceived by the worker W, during inspection work, to be required to be inspected.

The squawk processor 29e is used to cause an inspection target to perform squawk. Specifically, the squawk processor 29e determines whether an apparatus of an inspection target supports squawk (the presence or absence of squawk support: see FIG. 3) by referring to the apparatus information obtained by the search part 29c, and causes the apparatus to perform squawk in a case where it is determined that squawk is supported. Here, the squawk processor 29e transmits a control request to cause the above apparatus to perform squawk to the controller 12 through the wireless communicator 26, thereby causing the above apparatus to perform squawk.

The map display processor 29f causes the touch panel 25 to display a map (static map) in which at least information (for example, icon) for specifying the position of the inspection target (inspection target to be inspected next) indicated by the progress manager 29b is superimposed on the map of a plant, using the map information M stored in the storage 28. In a case where the position information of the terminal 15 is obtained by the positioning part 23, the map display processor 29f causes the touch panel 25 to display a map (dynamic map) in which information (for example, icon) for specifying the position of the terminal 15 is superimposed on the map of a plant, in addition to the information for specifying the position of the inspection target indicated by the progress manager 29b. in a case where the dynamic map is displayed, the distance and orientation from the present position to the inspection target to be inspected next are ascertained more easily.

The AR display processor 29g causes the touch panel 25 to display an image (AR image) in which additional information (for example, icon) indicating the inspection target indicated by the progress manager 29b is superimposed on the image captured by the camera 21, using an augmented reality (AR) technique. The AR display processor 29g specifies the position of the terminal 15 from the position information obtained by the positioning part 23, and specifies the posture or orientation of the terminal 15 (image-capturing direction of the camera 21) from the detection result of the orientation detector 24.

The terminal 15 described with reference to FIG. 2 is configured to entirely include the camera 21, the NFC reader-writer 22, the positioning part 23, the orientation detector 24, and the apparatus communicator 27, but a plurality of terminals 15 which are used by a plurality of workers W in the field of a plant do not necessarily include all these components. For example, there are various terminals that do not include the NFC reader-writer 22, do not include the camera 21 (or, cannot use the camera 21 from the viewpoint of security despite the camera being included), include the orientation detector 24 but not the positioning part 23, and the like. In the present embodiment, even such a terminal 15 can support the worker W.

(Inspection Work Support Method)

Figure 5:
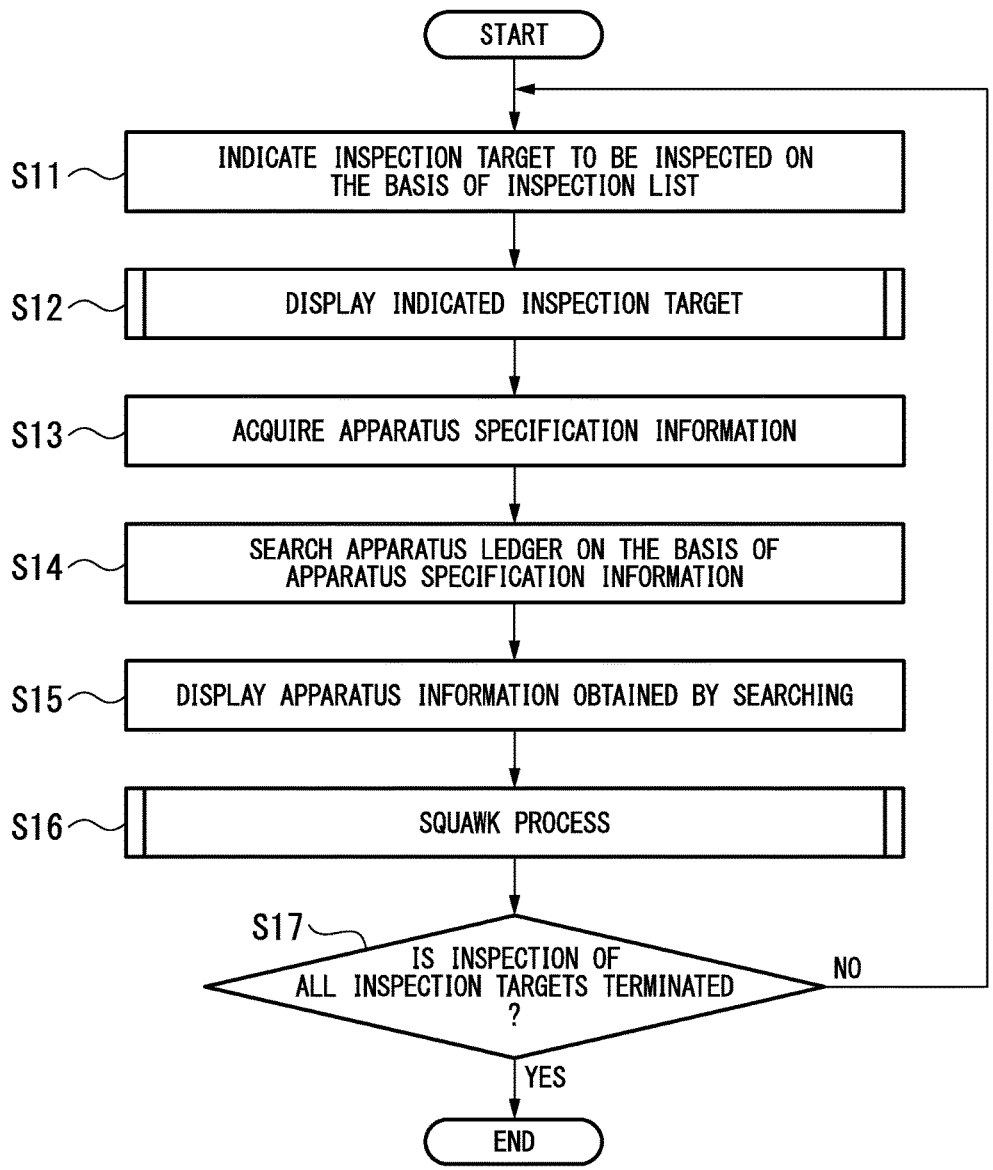
FIG. 5 is a flow diagram illustrating an example of an inspection work support method according to an embodiment of the present invention.
Figure 6:
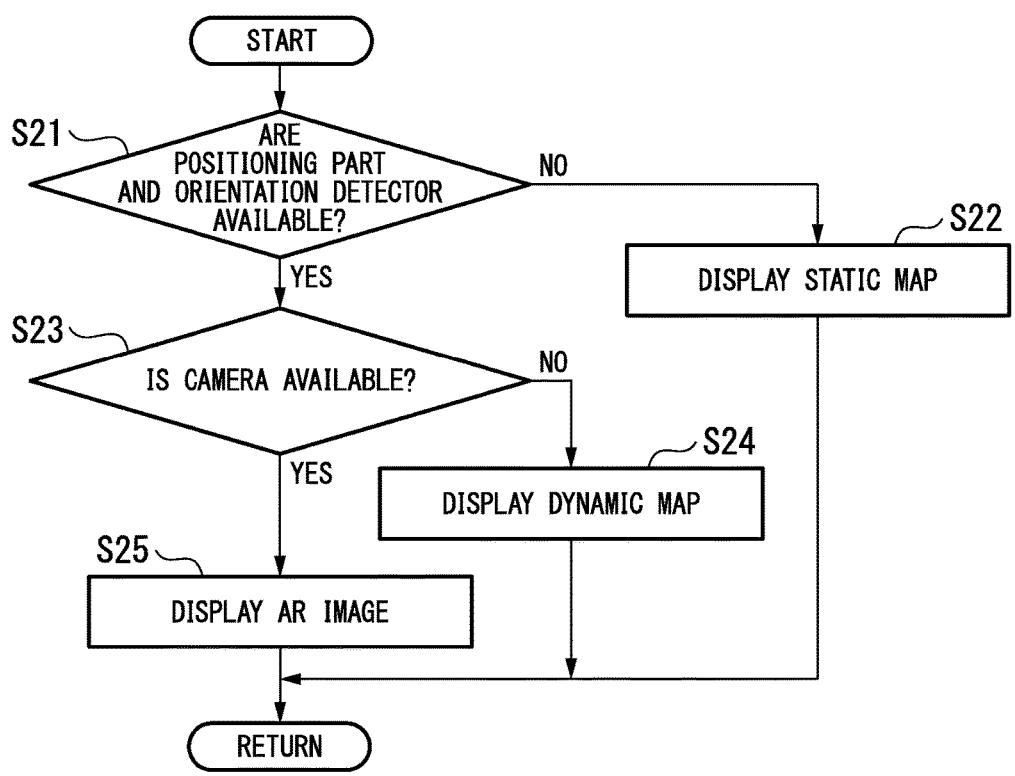
FIG. 6 is a flow diagram illustrating the details of a process performed in step S12 of FIG. 5.
Figure 7:
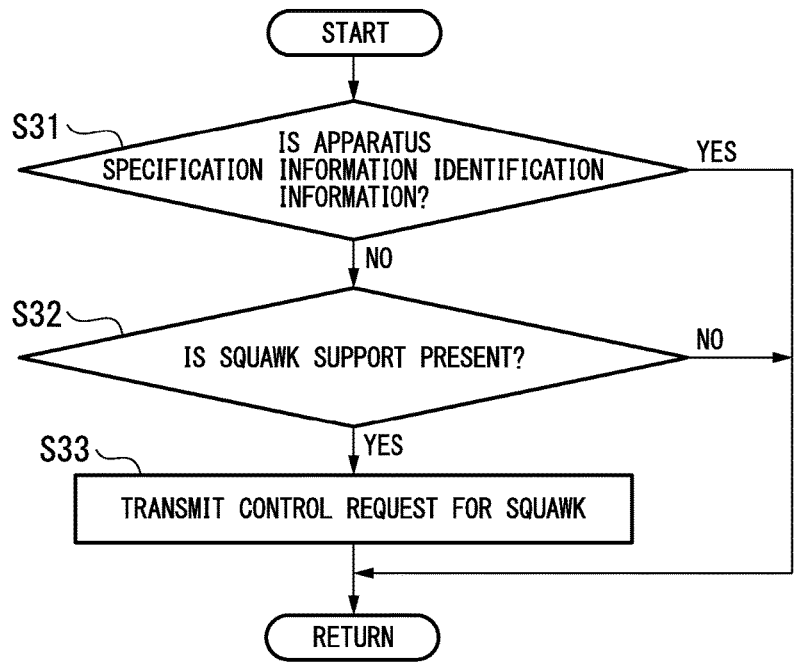
FIG. 7 is a flow diagram illustrating the details of a process performed in step S16 of FIG. 5.

FIG. 5 is a flow diagram illustrating an example of an inspection work support method according to an embodiment of the present invention. In addition, FIG. 6 is a flow diagram illustrating the details of a process performed in step S12 of FIG. 5, and FIG. 7 is a flow diagram illustrating the details of a process performed in step S16 of FIG. 5. The process of the flow diagram shown in FIG. 5 is started by the worker W operating the touch panel 25 (see FIG. 2) of the terminal 15, and instructing the terminal 15 to start inspection work.

When the process of the flow diagram shown in FIG. 5 is started, the inspection list L2 and the progress information P which are stored in the storage 28 are first read out, and a process of indicating an inspection target to be inspected based on the contents of the inspection list L2 and the progress information P is performed by the progress manager 29b (step S11). In a case of the inspection list L2 shown in FIG. 4, the field apparatus 11a (see FIG. 1) of which the position information is "P01" is indicated as an initial inspection target. Next, a process of displaying the inspection target indicated by the progress manager 29b on the touch panel 25 is performed by the map display processor 29f or the AR display processor 29g (step S12: first step).

In the process of step S12, as shown in FIG. 6, whether the positioning part 23 and the orientation detector 24 are available is first determined by the data processor 29 (step S21). In a case where it is determined that the positioning part 23 and the orientation detector 24 are not available (in a case where the determination result of step S21 is "NO"), a process of displaying a static map on the touch panel 25 is performed by the map display processor 29f (step S22). That is, the map display processor 29f performs a process of generating a map (static map) in which information (for example, icon) for reading out the map information M stored in the storage 28 and specifying the position of the inspection target (field apparatus 11a) is superimposed on the map of a plant, and displaying the generated map on the touch panel 25.

On the other hand, in a case where it is determined that the positioning part 23 and the orientation detector 24 are available (in a case where the determination result of step S21 is "YES"), whether the camera 21 is available is determined by the data processor 29 (step S23). In a case where it is determined that the camera 21 is not available (in a case where the determination result of step S23 is "NO"), a process of displaying a dynamic map on the touch panel 25 is performed by the map display processor 29f (step S24). That is, the map display processor 29f performs a process of generating a map (dynamic map) in which information (for example, icon) for specifying the position of the terminal 15 obtained by the positioning part 23 is superimposed on the map of a plant, and displaying the generated map on the touch panel 25, in addition to the information (for example, icon) for reading out the map information M stored in the storage 28 and specifying the position of the inspection target (field apparatus 11a).

On the other hand, in a case where it is determined that the camera 21 is available (in a case where the determination result of step S23 is "YES"), a process of displaying an AR image on the touch panel 25 is performed by the AR display processor 29g (step S25). That is, the AR display processor 29g performs a process of generating an image (AR image) in which additional information (for example, icon) indicating the inspection target (field apparatus 11a) is superimposed on an image captured by the camera 21, and displaying the generated image on the touch panel 25.

By referring to the static map, the dynamic map, or the AR image displayed on the touch panel 25 of the terminal 15, the worker W can easily ascertain the installation location of the inspection target (field apparatus 11a). In a case where a static map is displayed on the touch panel 25, it is possible to easily ascertain the installation position of the inspection target within a plant. In a case where a dynamic map is displayed on the touch panel 25, it is possible to easily ascertain the distance and orientation from the present position to the inspection target. In addition, in a case where an AR image is displayed on the touch panel 25, and an operation for changing the image-capturing direction of the camera 21 provided in the terminal 15 is performed, it is possible to easily ascertain whether the inspection target is installed ahead of the image-capturing direction. Therefore, the worker W can rapidly and accurately move to the installation location of the inspection target.

In a case where the worker W goes toward the installation location of the inspection target (field apparatus 11a), a process of acquiring apparatus specification information according to the instruction and operation of the worker W is performed (step S13: second step). In a case where the worker W goes toward the installation location of the inspection target (field apparatus 11a), the touch panel 25 of the terminal 15 is instructed to read the information code CD, and an operation for capturing an image of the information code CD provided in association with the field apparatus 11a using the camera 21 is performed by the worker W. In a case where such an instruction and operation are performed, image processing is performed on an image captured by the camera 21, and a process of acquiring the identification information "AAA" included in the information code CD as the apparatus specification information is performed by the identification information acquisition part 29a.

Subsequently, a process of searching the apparatus ledger L1 stored in the storage 28 is performed by the search part 29c based on the acquired apparatus specification information (step S14: third step). Specifically, the apparatus ledger L1 is searched using the identification information "AAA" acquired by the identification information acquisition part 29a as a key, and information (information stored in the entry E1 of the apparatus ledger L1 shown in FIG. 3) including the identification information "AAA" is acquired by the search part 29c. Next, a process of displaying the information acquired by the search part 29c on the touch panel 25 is performed by the data processor 29 (step S15: fourth step).

Thereby, information indicating the inspection target (field apparatus 11a) indicated by the progress manager 29b based on the inspection list L2 and information of the field apparatus 11a obtained based on the information code CD provided in association with the field apparatus 11a are displayed on the touch panel 25. By comparing these two pieces of information, the worker W can confirm that an inspection target at hand (inspection target which is provided with the information code CD) is the inspection target (field apparatus 11a) indicated by the progress manager 29b.

Subsequently, a squawk process is performed (step S16). In the process of step S16, as shown in FIG. 7, whether the apparatus specification information acquired in step S13 is identification information is first determined by the data processor 29 (step S31). As described above, in step S13, the identification information "AAA" included in the information code CD is acquired as the apparatus specification information by the instruction and operation of the worker W. Therefore, the determination result is "YES" and squawk is not performed. Since it is obvious that the information code CD is provided in association with the field apparatus 11a, and thus there is an extremely low possibility of the worker mistaking that the information code CD is provided in association with other field apparatuses (for example, field apparatuses 11b and 11c), squawk is not performed.

When the above-described processes are terminated, whether the inspection of all the inspection targets is terminated is determined by the progress manager 29b (step S17). In a case where it is determined that the inspection of all the inspection targets is not terminated (in a case where the determination result of step S17 is "NO"), the processes of steps S11 to S16 are performed again. In a case of the inspection list L2 shown in FIG. 4, the field apparatus 11b (see FIG. 1) of which the position information is "P02" is indicated as a second inspection target (step S11), and a process of displaying this inspection target on the touch panel 25 is performed by the map display processor 29f or the AR display processor 29g (step S12).

In a case where the worker W goes toward the installation location of the inspection target (field apparatus 11b), a process of acquiring apparatus specification information according to the instruction and operation of the worker W is performed (step S13). In a case where the worker W goes toward the installation location of the inspection target (field apparatus 11b), the touch panel 25 of the terminal 15 is instructed to perform NFC communication, and an operation for bringing the NFC reader-writer 22 of the terminal 15 close to the NFC tag TG is performed by the worker W. In a case where such an instruction and operation are performed, NFC is performed between the NFC tag TG and the NFC reader-writer 22 which are provided in association with the field apparatus 11b, and the tag information "TG02" stored in the NFC tag TG is acquired as the apparatus specification information.

Subsequently, a process of searching the apparatus ledger L1 stored in the storage 28 is performed by the search part 29c based on the acquired apparatus specification information (step S14). Specifically, the apparatus ledger L1 is searched using the tag information "TG02" acquired by the identification information acquisition part 29a as a key, and information (information stored in the entry E2 of the apparatus ledger L1 shown in FIG. 3) including the tag information "TG02" is acquired by the search part 29c. Next, a process of displaying the information acquired by the search part 29c on the touch panel 25 is performed by the data processor 29 (step S15).

Thereby, information indicating the inspection target (field apparatus 11b) indicated by the progress manager 29b based on the inspection list L2 and information of the field apparatus 11b obtained based on the NFC tag TG provided in association with the field apparatus 11b are displayed on the touch panel 25. By comparing these two pieces of information, the worker W can presume that an inspection target at hand (inspection target which is provided with the NFC tag TG) is the inspection target (field apparatus 11b) indicated by the progress manager 29b.

Subsequently, the squawk process is performed (step S16). In the process of step S16, as shown in FIG. 7, whether the apparatus specification information acquired in step S13 is identification information is first determined by the data processor 29 (step S31). As described above, in step S13, the tag information "TG02" included in the NFC tag TG is acquired as the apparatus specification information by the instruction and operation of the worker W. Therefore, the determination result is "NO", and whether the squawk support included in the information obtained in step S14 is "present" is determined by the squawk processor 29e (step S32).

Referring to FIG. 3, the "squawk support" stored in the entry E2 of the apparatus ledger L1 is "present", and thus the determination result is "YES". Then, a process of transmitting a control request to cause the field apparatus 11b to perform squawk to the controller 12 through the wireless communicator 26 is performed by the squawk processor 29e (step S33: fifth step). In a case where the "squawk support" is "absent", the determination result of step S32 is "NO", and the control request to cause squawk to be performed is not transmitted.

The control request transmitted from the wireless communicator 26 is received in the controller 12 through the wireless network N3, the wireless access point 14, and the intranet N2 (see FIG. 1) in order. The controller 12 causes the field apparatus 11b to perform squawk based on the control request from the terminal 15. Thereby, for example, a display device or a lamp provided in the field apparatus 11b blinks, and the worker W can confirm that an inspection target at hand (inspection target of which a display device or a lamp blinks) is the inspection target (field apparatus 11b) indicated by the progress manager 29b.

Here, it is obvious that the NFC tag TG is provided in association with the field apparatus 11b, similarly to a case where the information code CD is provided in association with the field apparatus 11a, and thus there is an extremely low possibility of the worker mistaking that the NFC tag TG is provided in association with other field apparatuses (for example, field apparatuses 11a and 11c). However, in a case where the communication distance of NFC is approximately several tens of cm, and a different NFC tag is installed close to the NFC tag TG, it is considered that there is the possibility of NFC being erroneously performed between the tag and another NFC tag. For this reason, as described above, squawk is performed, and thus the worker W finally confirms that an inspection target at hand (inspection target which is provided with the NFC tag TG) is the inspection target (field apparatus 11b) indicated by the progress manager 29b.

When the above-described processes are terminated, whether the inspection of all the inspection targets is terminated is determined again by the progress manager 29b (step S17). In a case where it is determined that the inspection of all the inspection targets is not terminated (in a case where the determination result of step S17 is "NO"), the processes of steps S11 to S16 are performed again. In a case of the inspection list L2 shown in FIG. 4, the field apparatus 11c (see FIG. 1) of which the position information is "P03" is indicated as a third inspection target (step S11), and a process of displaying this inspection target on the touch panel 25 is performed by the map display processor 29f or the AR display processor 29g (step S12).

In a case where the worker W goes toward the installation location of the inspection target (field apparatus 11c), a process of acquiring apparatus specification information according to the instruction and operation of the worker W is performed (step S13). In a case where the worker W goes toward the installation location of the inspection target (field apparatus 11c), the touch panel 25 of the terminal 15 is instructed to acquire position information, and an operation for bringing the terminal 15 close to the installation position of the field apparatus 11c is performed by the worker W. In a case where such an instruction and operation are performed, the position information of the terminal 15 is acquired as the apparatus specification information by the positioning part 23. Since the terminal 15 is disposed close to the field apparatus 11c when the position information is acquired, the position information acquired by the positioning part 23 can be regarded as position information indicating the installation position of the field apparatus 11c.

Subsequently, a process of searching the apparatus ledger L1 stored in the storage 28 is performed by the search part 29c based on the acquired apparatus specification information (step S14). Specifically, the apparatus ledger L1 is searched using the position information acquired by the positioning part 23 as a key, and information (information stored in the entry E3 of the apparatus ledger L1 shown in FIG. 3) including the position information "P03" of the field apparatus 11c is acquired by the search part 29c. Next, a process of displaying the information acquired by the search part 29c on the touch panel 25 is performed by the data processor 29 (step S15).

Thereby, information indicating the inspection target (field apparatus 11c) indicated by the progress manager 29b based on the inspection list L2 and information of the field apparatus 11c obtained based on the position information are displayed on the touch panel 25. By comparing these two pieces of information, the worker W can presume that an inspection target at hand is the inspection target (field apparatus 11c) indicated by the progress manager 29b.

Subsequently, the squawk process is performed (step S16). In the process of step S16, as shown in FIG. 7, whether the apparatus specification information acquired in step S13 is identification information is first determined by the data processor 29 (step S31). As described above, in step S13, the position information is acquired as the apparatus specification information by the instruction and operation of the worker W. Therefore, the determination result is "NO", and whether the squawk support included in the information obtained in step S14 is "present" is determined by the squawk processor 29e (step S32).

Referring to FIG. 3, since the "squawk support" stored in the entry E3 of the apparatus ledger L1 is "present", the determination result is "YES". Then, a process of transmitting a control request to cause the field apparatus 11c to perform squawk to the controller 12 through the wireless communicator 26 is performed by the squawk processor 29e (step S33). The controller 12 causes the field apparatus 11c to perform squawk based on the control request from the terminal 15. Thereby, for example, a display device or a lamp provided in the field apparatus 11c blinks, and the worker W can confirm that an inspection target at hand (inspection target of which a display device or a lamp blinks) is the inspection target (field apparatus 11c) indicated by the progress manager 29b.

Here, in a case where an error of approximately several tens of centimeters to several meters is included in the position information acquired by the positioning part 23, and other field apparatuses (for example, field apparatuses 11a and 11b) are installed close to the field apparatus 11c, it is considered that there is the possibility of apparatus information of the field apparatuses being searched. For this reason, as described above, squawk is performed, and thus the worker W finally confirms that an inspection target at hand is the inspection target (field apparatus 11c) indicated by the progress manager 29b.

As described above, the processes of steps S11 to S16 are repeatedly performed based on the inspection list L2, in accordance with the progress situation of the worker W. Thereby, inspection work of the worker W is supported, and thus it is possible to rapidly and accurately specify an inspection target. In a case where it is determined in the progress manager 29b that the inspection of all the inspection targets is terminated (in a case where the determination result of step S17 is "NO"), a series of processes shown in FIG. 5 is terminated.

Figure 8:
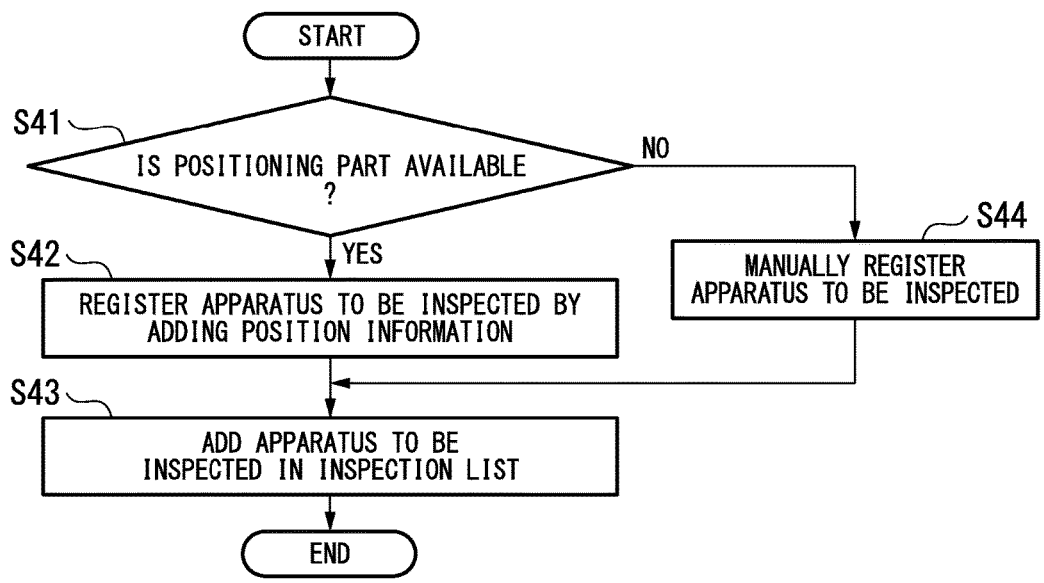
FIG. 8 is a flow diagram illustrating an example of a process performed when a new apparatus is registered as an inspection target in an embodiment of the present invention.

In a case where the worker W feels, for example, a symptom of the abnormality of an apparatus which is not included in the inspection list L2 in the midst of performing the inspection work of an inspection target described above, the apparatus can be registered as a new inspection target. FIG. 8 is a flow diagram illustrating an example of a process performed when a new apparatus is registered as an inspection target in an embodiment of the present invention. The process of the flow diagram shown in FIG. 8 is started by the worker W operating the touch panel 25 of the terminal 15, and instructing the terminal 15 to newly register an inspection target.

When the process of the flow diagram shown in FIG. 8 is started, whether the positioning part 23 is available is first determined by the data processor 29 (step S41). In a case where it is determined that the positioning part 23 is available (in a case where the determination result of step S41 is "YES"), a process of registering an apparatus to be newly inspected in the apparatus ledger L1 by adding the position information acquired by the positioning part 23 is performed (step S42).

When the registration in the apparatus ledger L1 is completed, a process of adding the apparatus to be newly inspected in the inspection list L2 is performed by the registration part 29d (step S43). Specifically, a process of adding an apparatus to be newly inspected between the inspection target in which inspection work is finally terminated and the next inspection target indicated by the progress manager 29b is performed by the registration part 29d. Such a process is performed, and thus it can be understood afterwards that the apparatus to be newly inspected is disposed on an inspection route between the inspection target in which inspection work is finally terminated and the next inspection target.

On the other hand, in a case where it is determined that the positioning part 23 is not available (in a case where the determination result of step S41 is "NO"), a process of manually registering the apparatus to be inspected is performed (step S44). That is, a process of registering the apparatus to be inspected in the apparatus ledger L1 is performed based on the contents of the operation of the touch panel 25 which is performed by the worker W. The position information of the apparatus to be inspected is also registered manually. When the registration in the apparatus ledger L1 is completed, a process of adding an apparatus to be newly inspected in the inspection list L2 is performed by the registration part 29d (step S43).

In this way, the worker W instructs the terminal 15 to newly register an inspection target in the midst of performing inspection work based on the inspection list L2, and thus it is possible to register an apparatus to be newly inspected. Then, the apparatus to be newly inspected is added to the inspection list L2 between the inspection target in which inspection work is finally terminated and the next inspection target indicated by the progress manager 29b. In addition, in a case where the positioning part 23 is available, the apparatus to be inspected has position information added thereto and then is registered. Therefore, even a different worker W to the worker W who has newly registered an inspection target can easily specify the newly registered inspection target. An issue device that issues an information code CD including identification information of the newly registered inspection target is provided in the terminal 15, and the issued information code CD is provided in association with the inspection target, thereby allowing the newly registered inspection target to be reliably specified.

Figure 9:
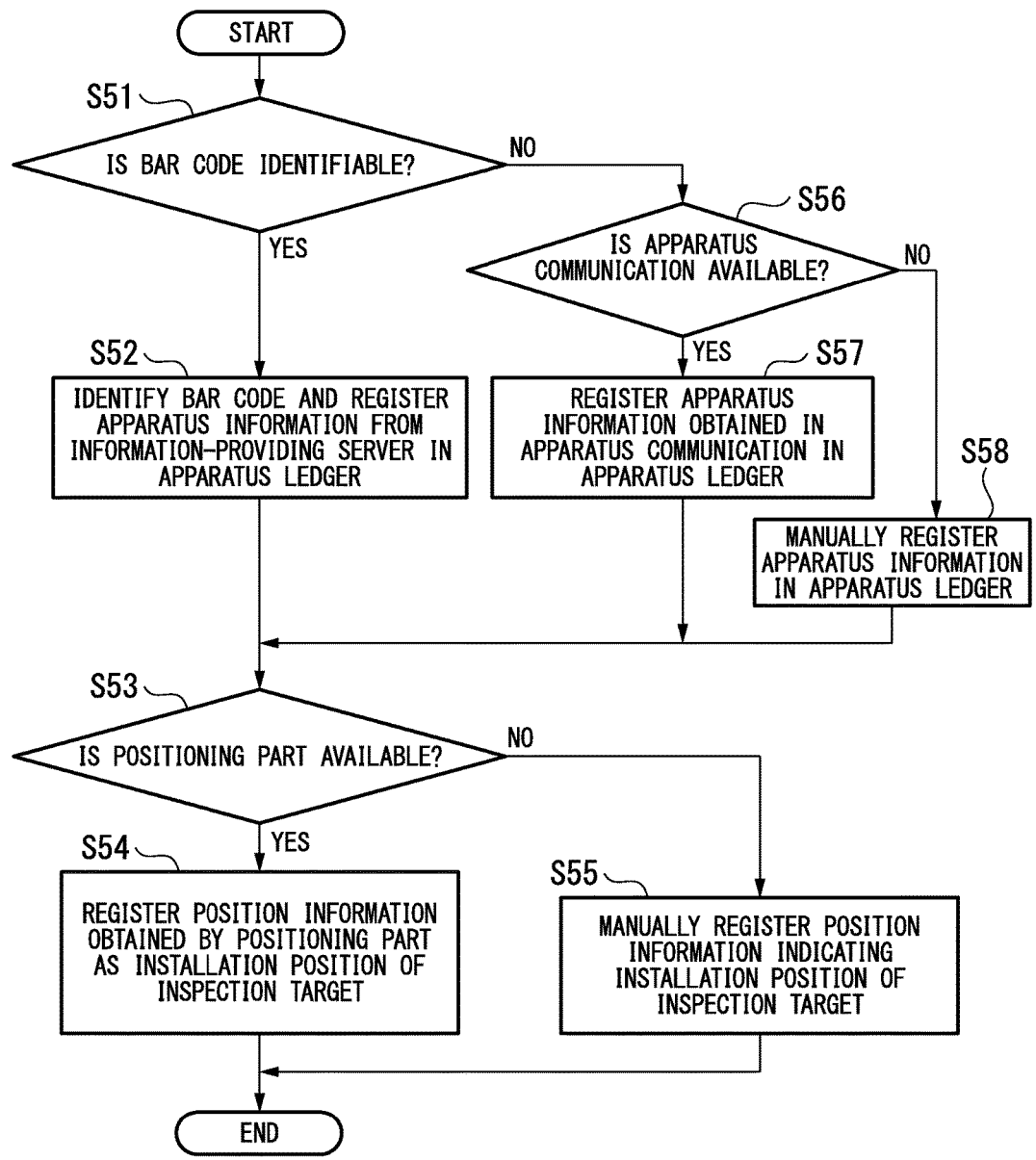
FIG. 9 is a flow diagram illustrating a method of registering an inspection target in an embodiment of the present invention.

Finally, a method of registering an inspection target will be described. FIG. 9 is a flow diagram illustrating a method of registering an inspection target in an embodiment of the present invention. The process of the flow diagram shown in FIG. 8 is performed when an apparatus not to be inspected is newly registered as an inspection target in the apparatus ledger L1 in the midst of the worker W performing inspection work. On the other hand, the process of the flow diagram shown in FIG. 9 is performed when the inspection list L2 is prepared, for example, after a plant is constructed and before the plant is put into operation.

In a case where the registration of an inspection target is performed, whether the terminal 15 can identify a bar code is first determined by the worker W (step S51). In a case where it is determined that the bar code can be identified (in a case where the determination result of step S51 is "YES"), the touch panel 25 of the terminal 15 is instructed to read the bar code, and an operation for capturing the bar code attached to the inspection target using the camera 21 is performed by the worker W. In a case where such an instruction and operation are performed, image processing is performed on an image captured by the camera 21, and information included in the bar code is acquired.

When the information included in the bar code is acquired, a request for transmission (request for transmission of apparatus information) including the information is transmitted from the terminal 15 to the information providing server 13. When the request for transmission from the terminal 15 is received, the information providing server 13 transmits apparatus information of an apparatus, specified by information included in the received request for transmission, to the terminal 15. When the apparatus information from the information providing server 13 is received by the terminal 15, a process of registering the apparatus information in the apparatus ledger L1 is performed (step S52).

When the above-described processes are terminated, whether the positioning part 23 is available is determined by the terminal 15 (step S53). In a case where it is determined that the positioning part 23 is available (in a case where the determination result of step S53 is "YES"), a process of registering position information obtained by the positioning part 23 as position information indicating the installation position of the inspection target registered in the apparatus ledger L1 in step S52 is performed (step S54). On the other hand, in a case where it is determined that the positioning part 23 is not available (in a case where the determination result of step S53 is "NO"), a process of manually registering the position information is performed (step S55).

On the other hand, in a case where it is determined by the worker W that the bar code cannot be identified (in a case where the determination result of step S51 is "NO"), whether apparatus communication is available is determined by the worker W (step S56). In a case where it is determined that the apparatus communication is available (in a case where the determination result of step S56 is "YES"), a process of registering the apparatus information obtained in the apparatus communication performed by the apparatus communicator 27 in the apparatus ledger L1 is performed (step S57). The registration of the position information is performed (steps S53 to S55).

On the other hand, in a case where it is determined that the apparatus communication is not available (in a case where the determination result of step S56 is "NO"), a process of manually registering the apparatus information in the apparatus ledger L1 is performed (step S58). The registration of the position information is performed (steps S53 to S55). An issue device that issues an information code CD including identification information of the registered inspection target may be provided in the terminal 15, and the information code CD of the inspection target registered in, for example, steps S57 and S58 may be issued and be provided in association with the inspection target.

As described above, in the present embodiment, the information indicating the inspection target indicated by the progress manager 29b based on the inspection list L2 and the information of the field apparatus 11 obtained based on the apparatus specification information are displayed on the touch panel 25 of the terminal 15. Therefore, by comparing these two pieces of information, it is possible to rapidly and accurately specify the inspection target. In addition, since the field apparatus 11 capable of squawk is caused to perform squawk, it is possible to more accurately specify the inspection target.

As described above, the inspection work support device, the inspection work support system, and the inspection work support method according to an embodiment of the present invention have been described, but the present invention can be freely changed within the scope of the present invention without being limited to the above-described embodiment. For example, in the above-described embodiment, a description has been given of an example in which the apparatus ledger L1, the inspection list L2, the progress information P, and the map information M are stored in the storage 28 of the terminal 15. However, these pieces of information may be stored in the information providing server 13, and the terminal 15 may have access to and make use of, as necessary, the information providing server 13. In addition, in the above-described embodiment, the apparatus information is displayed and then squawk is performed, but the apparatus information may not be displayed in a case where squawk is performed.

In addition, in the embodiment, to facilitate understanding, a description has been given of a case where the terminal 15 performs narrowly-defined near field communication (NFC communication). However, the terminal 15 may perform near field communication in the broad sense of the term such as Wi-Fi (Registered Trademark), ZigBee (Registered Trademark), or Bluetooth (Registered Trademark). In addition, in the above-described embodiment, a description has been given of an example in which the apparatus information of the field apparatus 11 is provided from the information providing server 13, but the apparatus information of the field apparatus 11 may be stored in the terminal 15 and the information providing server 13 may be omitted. In addition, the wireless access point 14 and the wireless network N3 may be omitted together with this.

As used herein, the following directional terms "forward, rearward, above, downward, right, left, vertical, horizontal, below, transverse, row and column" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

The term "configured" is used to describe a component, unit or part of a device includes hardware and/or software that is constructed and/or programmed to perform the desired function.

Moreover, terms that are expressed as "means-plus function" in the claims should include any structure that can be utilized to perform the function of that part of the present invention.

The term "unit" or "part" is used to describe a component, unit or part of a hardware and/or software that is constructed and/or programmed to perform the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An inspection work support device that supports inspection work performed in a plant, comprising:
a storage that stores an apparatus ledger in which apparatus information of an apparatus installed in the plant is registered, and an inspection list which indicates a list of inspection targets;
an indicator that indicates the inspection target to be inspected based on the inspection list;
an acquisition part that acquires apparatus specification information which is required for specifying the apparatus;
a search part that searches the apparatus ledger based on the apparatus specification information acquired by the acquisition part to obtain the apparatus information; and
a display that displays the inspection target indicated by the indicator and the apparatus information obtained by the search part,
wherein the acquisition part includes at least one of:
a first acquisition part that performs image processing on an image acquired by an image processor to acquire information of an identifier, provided in association with the apparatus included in the image, as the apparatus specification information;
a second acquisition part that performs near field communication with a near field communication tag provided in association with the apparatus to acquire storage information stored in the near field communication tag as the apparatus specification information; and
a third acquisition part that acquires position information indicating an installation position of the apparatus as the apparatus specification information based on a position of the inspection work support device,
wherein the storage stores map information of the plant, and
wherein the inspection work support device further comprises:
a first display processor that superimposes at least the inspection target indicated by the indicator on a map of the plant, using the map information stored in the storage, to display the superimposed target on the display.

2. The inspection work support device according to claim 1, further comprising:
a response processor that causes the apparatus to perform response processing specified in advance, using the apparatus information obtained by the search part.

3. The inspection work support device according to claim 2, further comprising:
a communicator capable of communicating with a controller that controls the apparatus,
wherein the response processor causes the apparatus to perform the response processing by transmitting a control request to cause the apparatus to perform the response processing to the controller through the communicator.

4. An inspection work support system that supports inspection work performed in a plant, comprising:
a controller that controls an apparatus installed in the plant; and
the inspection work support device according to claim 3 which transmits a control request to cause the apparatus to perform the response processing to the controller.

5. The inspection work support device according to claim 1, wherein in a case where the acquisition part includes at least two or more of the first acquisition part, the second acquisition part, and the third acquisition part, those acquiring the apparatus specification information are capable of selecting.

6. The inspection work support device according to claim 1, further comprising:
an operation device that is operated by a worker who works in the plant; and
a registration part that registers the apparatus information of the apparatus to be used as the inspection target, in the apparatus ledger, based on operation contents of the operation device, and adds the apparatus, as the inspection target, to the inspection list.

7. The inspection work support device according to claim 1, wherein in a case where the acquisition part includes the third acquisition part, the first display processor superimposes the position of the inspection work support device on the map of the plant to display the superimposed position on the display.

8. An inspection work support device that supports inspection work performed in a plant, comprising:
a storage that stores an apparatus ledger in which apparatus information of an apparatus installed in the plant is registered, and an inspection list which indicates a list of inspection targets;
an indicator that indicates the inspection target to be inspected based on the inspection list;
an acquisition part that acquires apparatus specification information which is required for specifying the apparatus;
a search part that searches the apparatus ledger based on the apparatus specification information acquired by the acquisition part to obtain the apparatus information; and
a display that displays the inspection target indicated by the indicator and the apparatus information obtained by the search part,
wherein the acquisition part includes at least one of:
a first acquisition part that performs image processing on an image acquired by an image processor to acquire information of an identifier, provided in association with the apparatus included in the image, as the apparatus specification information;
a second acquisition part that performs near field communication with a near field communication tag provided in association with the apparatus to acquire storage information stored in the near field communication tag as the apparatus specification information; and
a third acquisition part that acquires position information indicating an installation position of the apparatus as the apparatus specification information based on a position of the inspection work support device, and wherein the inspection work support device further comprises:
a second display processor that superimposes additional information indicating the inspection target indicated by the indicator, on the image acquired by the image processor, to display the superimposed information on the display.

9. The inspection work support device according to claim 8, further comprising:
a response processor that causes the apparatus to perform response processing specified in advance, using the apparatus information obtained by the search part.

10. The inspection work support device according to claim 9, further comprising:
a communicator capable of communicating with a controller that controls the apparatus,
wherein the response processor causes the apparatus to perform the response processing by transmitting a control request to cause the apparatus to perform the response processing to the controller through the communicator.

11. An inspection work support system that supports inspection work performed in a plant, comprising:
a controller that controls an apparatus installed in the plant; and
the inspection work support device according to claim 10 which transmits a control request to cause the apparatus to perform the response processing to the controller.

12. The inspection work support device according to claim 8, wherein in a case where the acquisition part includes at least two or more of the first acquisition part, the second acquisition part, and the third acquisition part, those acquiring the apparatus specification information are capable of selecting.

13. The inspection work support device according to claim 8, further comprising:
an operation device that is operated by a worker who works in the plant; and
a registration part that registers the apparatus information of the apparatus to be used as the inspection target, in the apparatus ledger, based on operation contents of the operation device, and adds the apparatus, as the inspection target, to the inspection list.

14. The inspection work support device according to claim 8,
wherein the storage stores map information of the plant,
wherein the inspection work support device further comprises:
a first display processor that superimposes at least the inspection target indicated by the indicator on a map of the plant, using the map information stored in the storage, to display the superimposed target on the display, and
wherein in a case where the acquisition part includes the third acquisition part, the first display processor superimposes the position of the inspection work support device on the map of the plant to display the superimposed position on the display.

15. An inspection work support method of supporting inspection work performed in a plant, the method implemented with a computer system coupled with memory-stored executable instructions which, when executed by the computer system, cause the computer system to perform the method, comprising:

storing, into a storage, an apparatus ledger in which apparatus information of an apparatus installed in the plant is registered, and an inspection list which indicates a list of inspection targets;
indicating, by an indicator implemented with the method, the inspection target to be inspected based on the inspection list;
acquiring, by an acquisition part implemented with the method, apparatus specification information which is required for specifying the apparatus;
searching, by a search part implemented with the method, the apparatus ledger based on the apparatus specification information acquired by the acquisition part to obtain the apparatus information; and
displaying, by a first display unit implemented with the method, the inspection target indicated by the indicator and the apparatus information obtained by the search part,
wherein the acquisition part includes at least one of:
a first acquisition part that performs image processing on an image acquired by an image processor to acquire information of an identifier, provided in association with the apparatus included in the image, as the apparatus specification information;
a second acquisition part that performs near field communication with a near field communication tag provided in association with the apparatus to acquire storage information stored in the near field communication tag as the apparatus specification information; and
a third acquisition part that acquires position information indicating an installation position of the apparatus as the apparatus specification information based on a position of the inspection work support device,
wherein the inspection work support method further comprises:
storing, into the storage, map information of the plant; and
superimposing, by second display unit implemented with the method, at least the inspection target indicated by the indicator on a map of the plant, using the map information stored in the storage, to display the superimposed target on the first display.

16. The inspection work support method according to claim 15, further comprising:
causing, by a response processor, the apparatus to perform response processing specified in advance, using the apparatus information obtained by the search part the third step.

17. The inspection work support method according to claim 16, wherein
causing, by a response processor, the apparatus to perform the response processing by a control request for causing the apparatus to perform the response processing being transmitted.

18. The inspection work support method according to claim 15, wherein the acquisition part performs at least one of:
performing image processing on an acquired image to acquire information of an identifier, provided in association with the apparatus included in the image, as the apparatus specification information;
performing near field communication with a near field communication tag provided in association with the apparatus to acquire storage information stored in the near field communication tag as the apparatus specification information; and acquiring position information indicating an installation position of the apparatus as the apparatus specification information based on a position of the inspection work support device.

19. The inspection work support method according to claim 18, wherein in a case where the acquisition part performs at least two or more of performing the image processing, performing the near field communication, and acquiring the position information, those acquiring the apparatus specification information are capable of selecting.

20. An inspection work support method of supporting inspection work performed in a plant, the method implemented with a computer system coupled with memory-stored executable instructions which, when executed by the computer system, cause the computer system to perform the method, comprising:
   storing, into a storage implemented with the inspection support method, an apparatus ledger in which apparatus information of an apparatus installed in the plant is registered, and an inspection list which indicates a list of inspection targets;
   indicating, by an indicator implemented with the method, the inspection target to be inspected based on the inspection list;
   acquiring, by an acquisition part implemented with the method, apparatus specification information which is required for specifying the apparatus;
   searching, by a search part implemented with the method, the apparatus ledger based on the apparatus specification information acquired by the acquisition part to obtain the apparatus information; and
   displaying, by a first display unit implemented with the method, the inspection target indicated by the indicator and the apparatus information obtained by the search part,
wherein the acquisition part includes at least one of:
a first acquisition part that performs image processing on an image acquired by an image processor to acquire information of an identifier, provided in association with the apparatus included in the image, as the apparatus specification information;
a second acquisition part that performs near field communication with a near field communication tag provided in association with the apparatus to acquire storage information stored in the near field communication tag as the apparatus specification information; and
a third acquisition part that acquires position information indicating an installation position of the apparatus as the apparatus specification information based on a position of the inspection work support device, and
wherein the inspection work support method further comprises:
superimposing, by a second display unit implemented with the method, additional information indicating the inspection target indicated by the indicator, on the image acquired by the image processor, to display the superimposed information on the first display.

* * * * *